W. C. MARSHALL.
VEHICLE LAMP.
APPLICATION FILED JUNE 17, 1909.
1,008,045.
Patented Nov. 7, 1911.
2 SHEETS—SHEET 1.
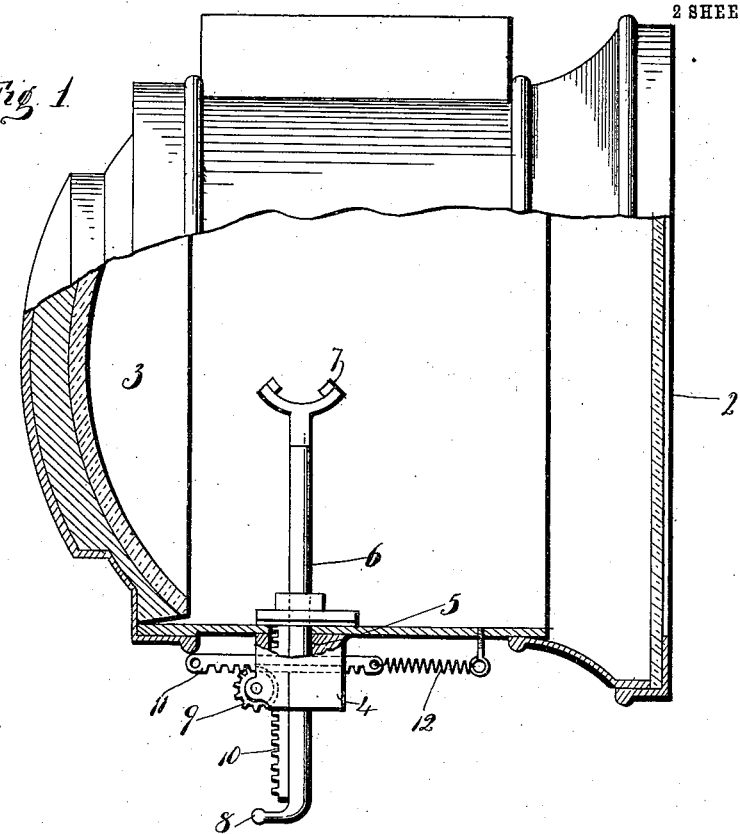
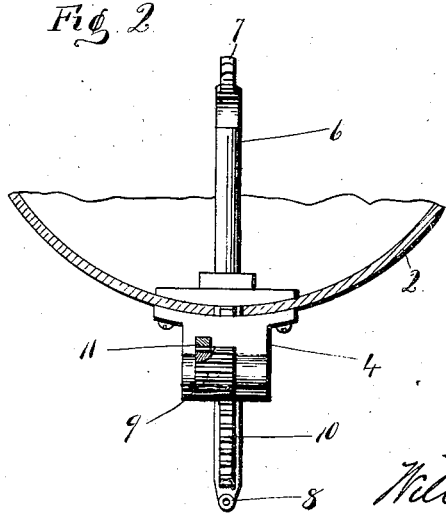

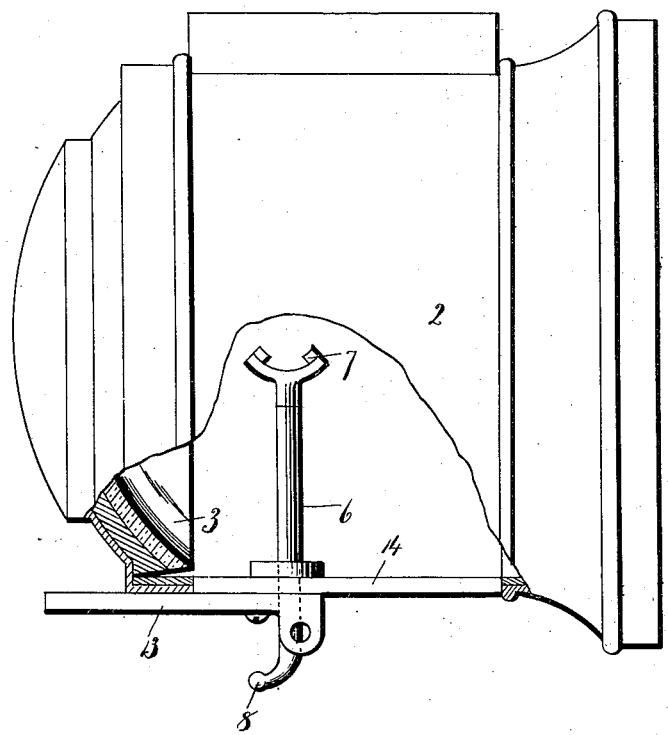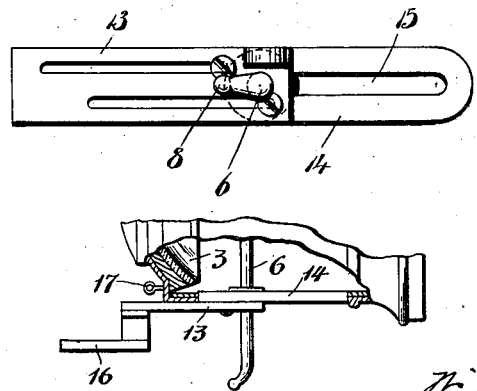

UNITED STATES PATENT OFFICE.

WILLIAM C. MARSHALL, OF NEW HAVEN, CONNECTICUT.

VEHICLE-LAMP.

1,008,045.

Specification of Letters Patent.   Patented Nov. 7, 1911.

Application filed June 17, 1909. Serial No. 502,646.

*To all whom it may concern:*

Be it known that I, WILLIAM C. MARSHALL, a citizen of the United States, residing at New Haven, in the county of New Haven and State of Connecticut, have invented a new and useful Improvement in Vehicle-Lamps; and I do hereby declare the following, when taken in connection with the accompanying drawings and the letters of reference marked thereon, to be a full, clear, and exact description of the same, and which said drawings constitute part of this specification, and represent, in—

Figure 1 a side view partially in section of a vehicle lamp embodying my invention. Fig. 2 a broken transverse sectional view. Fig. 3 a broken side view of a vehicle lamp illustrating a modified arrangement of burner. Fig. 4 an underside view showing the slide and guide. Fig. 5 a broken view illustrating the fixed burner and removable lamp case.

This invention relates to an improvement in vehicle lamps of the search-light type such as are used on automobiles, motor boats, trolley cars and in similar places. In the use of these search lights, it is desirable when two vehicles are approaching each other to dim the lights, so that the light of one vehicle will not blind the eyes of the operator of the other vehicle.

The object of this invention is a simple arrangement of parts whereby the effect of the reflector will be destroyed or the rays deflected downward at such a short angle that the strong light due to the reflector will be reduced; and the invention consists in the construction as will be hereinafter described and particularly recited in the claims.

In carrying out my invention I employ a lamp 2 which may be of any approved construction including a reflector 3 which is usually of the parabolic or spherical type. In one form of my invention as shown in Figs. 1 and 2 of the drawings, I mount a housing 4 in the bottom of the lamp case, and in this housing is a vertical opening 5 for the passage through it of a tube 6 which carries a gas burner 7 of usual construction. At the lower end of the tube 6 is a nipple 8 for connection by flexible tubing in the usual way to a gas tank, or if electricity is employed, to the wires. Mounted in the housing at one side thereof is a pinion 9 which meshes with a rack 10 secured to or formed integral with the tube 6. Also meshing with the pinion 9 is a longitudinally movable rack 11 which is guided for longitudinal movement below the lamp case, and which is connected thereto through a spiral spring 12, the tendency of which is to move the rack forward. This rack is connected by any suitable means, not shown, to a convenient point in the vehicle so that it may be moved back or forth. The burner is arranged to normally stand so that the rays of light will be directed in line with the longitudinal axis of the case, but by moving the burner up or down the direction of these rays will be changed so that the rays will shoot up or down from a central line instead of directly outward. By moving the rack 11, the pinion 9 will be rotated, moving the rack 10 up or down, thereby raising or lowering the burner 7. Thus, for instance, if two vehicles are approaching each other, the rack 11 may be drawn rearward by means of a lever or other convenient means, turning the pinion 9 and raising the burner 7 to such a point that the rays from the lamp will be deflected almost directly downward, and so that at a slight distance there will be no glare whatever. When the rack 11 is released the spring 12 will move it, and consequently the burner, to its normal position.

Instead of moving the burner vertically, as just described, it may be moved longitudinally with respect to the lamp. Thus as shown in Figs. 3 and 4 of the drawings, the burner tube 6 is secured to a slide 13 mounted at the bottom of the lamp case which will be provided with a guide 14 having a clearance slot 15 through which the burner tube extends; and by moving this slide back or forth by any convenient means, the burner will be moved toward or from the reflector in a vertical plane containing the axis or focus of the reflector so as to change the angle of deflection of the rays reflected thereby.

Instead of moving the burner with relation to the lamp, the slide 13 carrying the burner may be provided with a bracket 16 or other device by which it may be rigidly attached to a vehicle, and the lamp-case provided with an eye 17 or other device by which the lamp-case may be moved from any convenient point. By the term "burner" I wish to be understood as including gas, or oil burners or an electric light.

I claim:—

1. The combination with the lamp casing, of a stationary reflector mounted at the rear of the casing, said casing formed with a burner opening in the bottom of said casing forward of the reflector, a burner tube extending through said opening into the casing, a burner at the upper end of said tube, and a movable slide connected with said burner for moving said burner in a plane containing the focus of the reflector.

2. The combination with the lamp casing, of a stationary reflector mounted at the rear of said casing, a burner opening in the bottom of the casing forward of the reflector, a housing mounted at the bottom of said casing around said burner opening, a burner tube vertically movable through said housing, a burner at the upper end of said tube, and a slide for moving said tube.

3. In a vehicle lamp, a vertically movable burner tube, a rack carried thereby, a pinion meshing with said rack, and a longitudinally movable rack also meshing with said pinion, and means for moving said rack.

4. In a vehicle lamp, the combination with the casing, of a housing mounted at the bottom, a burner tube longitudinally movable through said housing and provided with a rack, a pinion mounted in said housing and meshing with said rack, a longitudinally movable rack also meshing with said pinion, means for moving said rack, and a spring connected with the rack and with the casing for returning the rack to its normal position.

In testimony whereof, I have signed this specification in the presence of two subscribing witnesses.

WILLIAM C. MARSHALL.

Witnesses:
FREDERIC C. EARLE,
CLARA L. WEED.